(12) United States Patent
Gabriel

(10) Patent No.: US 6,591,738 B2
(45) Date of Patent: *Jul. 15, 2003

(54) SIGNALING THE COOKING STATE OF FOOD COOKED IN PIECES

(76) Inventor: Rupprecht Gabriel, Berliner Strasse 46 D-33813, Oerlinghausen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/961,902

(22) Filed: Sep. 24, 2001

(65) Prior Publication Data

US 2002/0046582 A1 Apr. 25, 2002

Related U.S. Application Data

(63) Continuation of application No. 09/446,574, filed on May 17, 2000, now Pat. No. 6,293,188.

(30) Foreign Application Priority Data

Jun. 22, 1997 (DE) .......................................... 197 26 416
Jun. 22, 1998 (WO) ............................... PCT/DE98/01704

(51) Int. Cl.[7] ............................ G01K 3/04; G01K 7/42; A47J 27/62; A47J 29/00
(52) U.S. Cl. ............................. 99/336; 99/342; 99/343; 99/344
(58) Field of Search .......................... 99/342, 343, 344, 99/336, 440

(56) References Cited

U.S. PATENT DOCUMENTS

| | | | |
|---|---|---|---|
| 4,085,493 A | 4/1978 | Chadwick | 29/455 |
| 5,699,721 A | 12/1997 | Funke | 99/336 |
| 5,723,847 A | 3/1998 | Böldt | 219/506 |
| 6,123,013 A | 9/2000 | Ruggiero | 99/331 |
| 6,293,188 B1 | 9/2001 | Gabriel | 99/336 |

FOREIGN PATENT DOCUMENTS

| | | |
|---|---|---|
| DE | 33 42 939 | 11/1984 |
| EP | 0 441 432 | 8/1991 |
| JP | 59 203931 | 11/1984 |
| JP | 60 036924 | 2/1985 |
| JP | 60 257332 | 12/1985 |

*Primary Examiner*—Reginald L. Alexander
(74) *Attorney, Agent, or Firm*—Duane Morris LLP

(57) ABSTRACT

The invention provides a device for signaling a cooking state for at least one cooking item, such as an egg, a potato, a pepper, rice, noodles, that are being cooked in a liquid cooking medium. The device includes an at least partially floating jacket, a temperature sensor arranged in thermally conductive communication with the floating jacket, an analog-to-digital converter, a digital computing unit and a signaling device. The digital computing unit includes a digital delay portion to delay a temperature value of the liquid cooking medium that is measured by the sensor and digitized with the analog-to-digital converter. The delay portion has at least one thermal time constant to provide a thermally delayed inner temperature value as an output of the delay portion. A switching device is provided to activate the signaling device once a first temperature threshold is reached by the output of the delay portion, for signaling a first cooking state of the at least one cooking item.

26 Claims, 4 Drawing Sheets

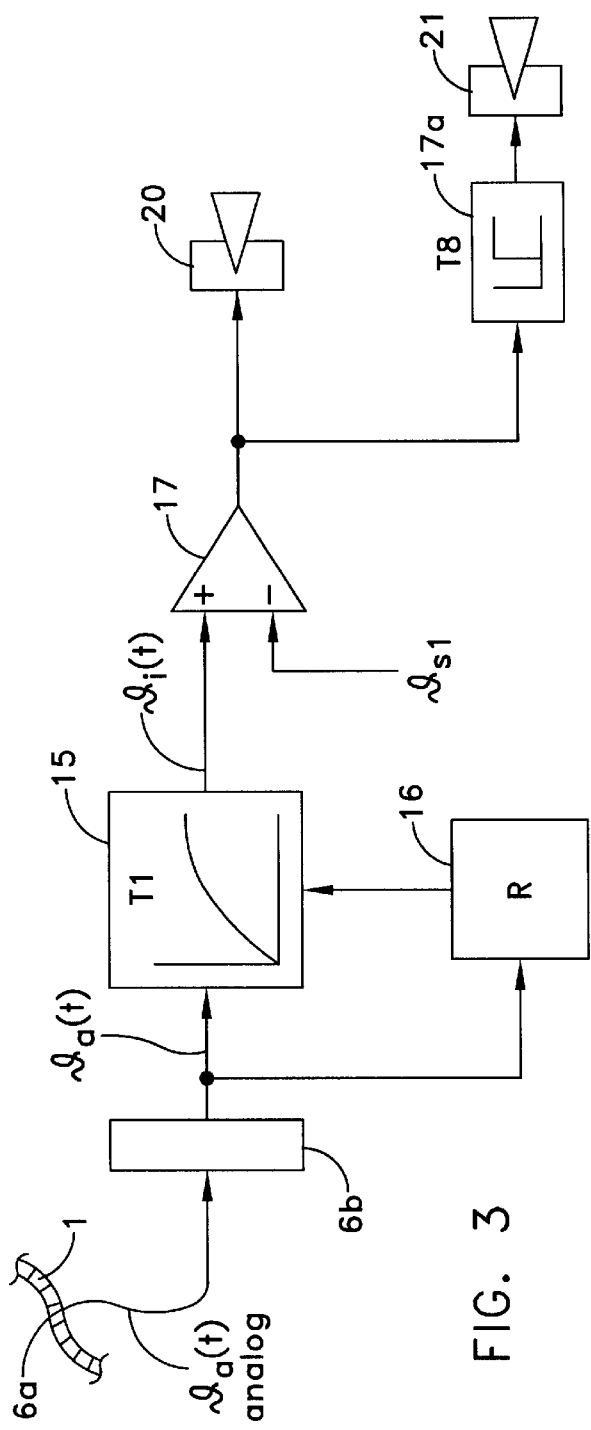
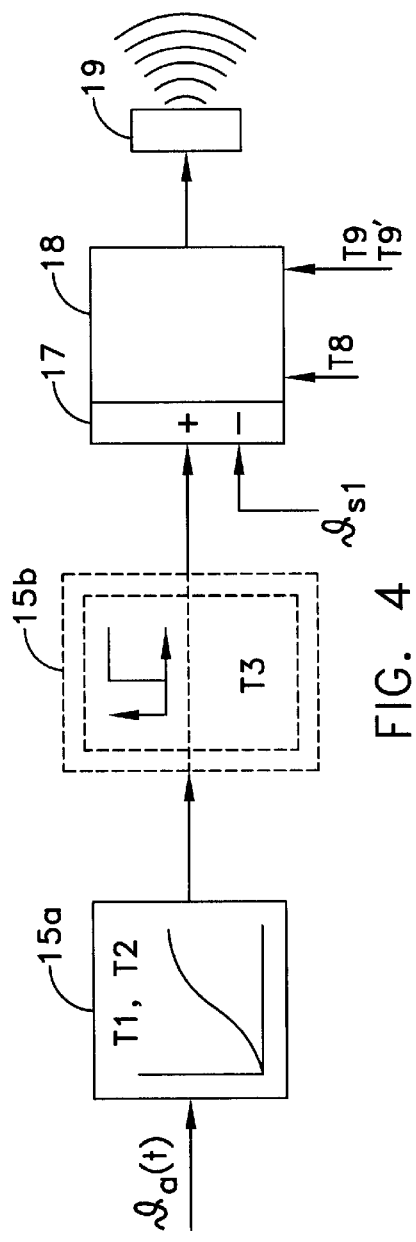
FIG. 3
FIG. 4

SIGNALING THE COOKING STATE OF FOOD COOKED IN PIECES

RELATED APPLICATION

The following is a continuation application of U.S. patent application Ser. No. 09/446,574 filed May 17, 2000 now U.S. Pat. No. 6,293,188.

FIELD OF INVENTION

The invention relates to a device which is operable to simulate the cooking state of goods, such as eggs, potatoes, rice and the like, and which allows a precise control and signaling of the cooking state to be reached. Usually, egg timers or other timers are employed for cooking e.g. eggs. The disadvantages of this method are the poor precision and the fact that the timer can only be started once the boiling temperature of the water is reached and after the egg has been immersed therein, i.e, a number of actions of the "egg cook" are required. Many users are overstrained by that especially if they have just tiredly fallen out of bed.

BACKGROUND OF THE INVENTION

Cooking aids employing mechanical thermal models are known from various documents, e.g. EP 145 953 A2, U.S. Pat. No. 4,085,493 and EP-A 441 432. In this connection, the thermal models are simulated by appropriate materials which reproduce the thermal differential equation of the inner warming of the egg. A thermal sensor, starting a sound provider or indicating the temperature (thermometer), respectively, is then also used for indicating the cooking state. The known starting of a timer above a certain temperature is not precise either, since in this case it is necessary to wait until the water boils before the egg and the cooking aid may be immersed therein, since the influence of heating the water on the cooking state is not simulated correctly. The invention described herein avoids the disadvantages related to the principles of prior art devices.

BRIEF SUMMARY OF INVENTION

The invention is to provide the user with a particularly simple aggregate, which simulates the cooking state very precisely and which can also be started with cold water. A number of successive controls of the cooking degree are intended to be possible without long intermediate waiting times.

According to the invention the thermal model is not simulated mechanically by material selection but by a digital computing unit making use of the differential equation (or more precise difference equation). The input of the computing model is the temperature of the cooking medium, usually water, measured with as little delay as possible. This measured value is provided by an electronic sensing device, which may be provided, for example, in the integrated circuit as a bandgap temperature sensor, or by external electric temperature sensing devices, such as a PT 100 sensing device, an iron/constantan temperature sensor, a PTC, etc.

The differential equation is provided by a digitally working model since analog circuits (RC filters) are not suitable for the long time constants for various disadvantages. The low currents and the considerable ambient temperature together with the moisture of the boiling water, sometimes even with salt, cause all kinds of electronic circuits of the analog type to become imprecise or fail. With a computing unit of digital character said disadvantages can be avoided. The precision is determined exclusively by the precision of the sensor, the AD converter and the time reference of the computing unit. Such arrangements may be produced with high precision.

The thermal differential equation of the cooking item is discretely calculated in the computing unit. In the simplest case, which matches reality quite well, it is sufficient to represent the march of temperature within the cooking item by a low pass of the first order as a "delay having a thermal time constant":

$$\vartheta_i(t) + T1 \, d\vartheta_i(t)/dt = \vartheta_a(t)$$

wherein $\vartheta_i(t)$=the inner temperature of the device
T1=the time constant of the warming of the cooking item
$\vartheta_a(t)$=the water temperature.

The differential equation is reproduced in the discretely working computing unit by a difference equation. The time constant T1 of the cooking item is detected experimentally by performing measurements with a thermometer, which is introduced into a selected cooking item (e.g. an egg), or by measuring the cooking state at a constant water temperature in certain time intervals and incorporated into the differential equation. The latter method is particularly suited for other cooking items (e.g. rice, noodles, potatoes), the temperature of which cannot be measured and which require a sensory testing (tasting the cooked food). In this case the measurements are repeated at different water temperatures in order to determine the order of the differential equation. Especially if swelling processes during cooking are important for the cooking state to be achieved (e.g. with rice or noodles), the differential equation of the first order may possibly not provide satisfactory results so that an equation of the second order will provide good results. The first time constant T1, which is greater, simulates the cooking state, wherein the second (lesser) time constant T2 simulates the swelling process. A dead time T3 may also replace the second (lesser) time constant.

A further problem which arises with prior art "mechanical" thermal models is the long resetting period. A thermal model provided by mechanical means cannot be reset. In the present electronic model according to the invention the thermal time delay is reduced during cooling off. Thereby it is possible to start a new cooking process already very shortly after removing the cooking aid. This is not possible with a mechanical solution since typically the same period of time is required for cooling off as for the cooking process itself. This constitutes a great disadvantage if the person cooking the egg, after having eaten the first egg, decides that he wants to have another egg. Having to wait now makes breakfast a punishment.

As the signal provider e.g. a melody generator is used which is, however, not triggered off by means of a temperature sensor or switch, as described in EP-A A 441 432, but by the result of the computing unit. In the arrangement according to the invention the temperature sensor is located outside (i.e. quick), whereas in the prior art solutions the temperature is measure inside, i.e. delayed only.

The cooking process using the arrangement according to the invention is conceivably simple and feasible even without reading an operating manual. Take the cooking item and put it into the water together with the cooking aid. If a melody or a signal tone is heard the desired state is reached. The cooking item and the cooking aid are removed from the water. The process can now be restarted. In this connection it is irrelevant whether the water boils or is still cold at the beginning of the cooking process which constitutes a considerable simplification of operation. By means of the cooking aid it is possible, without great intellectual efforts, to make even a person who is most inexperienced in cooking a true expert of e.g. cooking eggs.

The device to be used as the cooking aid may also be used for other products than eggs. The time constant of the digital thermal model is then adapted accordingly in the program.

Furthermore, the state of the cooking degree of the cooking item, e.g. of the egg, to be achieved can be made tactilely "graspable" by suitably designing the housing. A soft egg is given a soft plastic material or silicone shell. The user thus directly senses the condition the egg is supposed to have. Maloperations can thus be effectively prevented even with illiterates. The hard egg is analogously given a hard shell. The computing unit is therefore adapted to the desired cooking state (determined by the design of the jacket) and produces the appropriate signals.

Apart from the direct signaling of only one cooking state a signal generator may be integrated, which produces different signals for different cooking states. This may, for example, be one beep for soft, two beeps for medium and three beeps for hard. In this connection, the first time is determined by the digital thermal model, wherein the further times are determined by an internal timer, which triggers off further signal tones. In this way, for example, different cooking states may be signaled during cooking with one device only.

Moreover, the cooking aid may provide a signal indicating that from now on cooking with reduced supply of energy will lead to the desired result. This signal is provided for eggs upon reaching a water temperature of approx. 95° C. (90° C. to 100° C.). The thermal mass of the water is then capable of completing the cooking process without any supply of energy and thus in an economical manner. For other cooking items having longer cooking times two signals may be provided. The first one upon reaching a water temperature of approx. 95° C. and the second one approx. 5 minutes before the expected end of the cooking process. The first signal indicates that the power supply may be reduced, the second signal indicates that the process may be completed without any supply of energy.

Other cooking items may be programmed by appropriately adapting the parameters of the digital thermal model. The housings are selected such that they are unambiguously associated with the food to be cooked in pieces. This is e.g. the shape of a potato for the cooking aid for potatoes, the shape of a Chinese for the cooking aid for rice, the cooking aid for peppers is given the shape of a pepper pod and the cooking aid for milk is incorporated into a floating plastic cow. In the latter case the "food to be cooked in pieces" is the device itself.

BRIEF DESCRIPTION OF THE DRAWINGS

Embodiments are meant to explain and supplement the invention.

FIG. 3 shows a first inner structure of the embodiment of the device, which may be provided in the chip 6 with regard to programming and/or circuitry.

FIG. 4 is an alternative structure within the chip 6.

DETAILED DESCRIPTION OF THE PREFERRED EMBODIMENT

Figure 1:
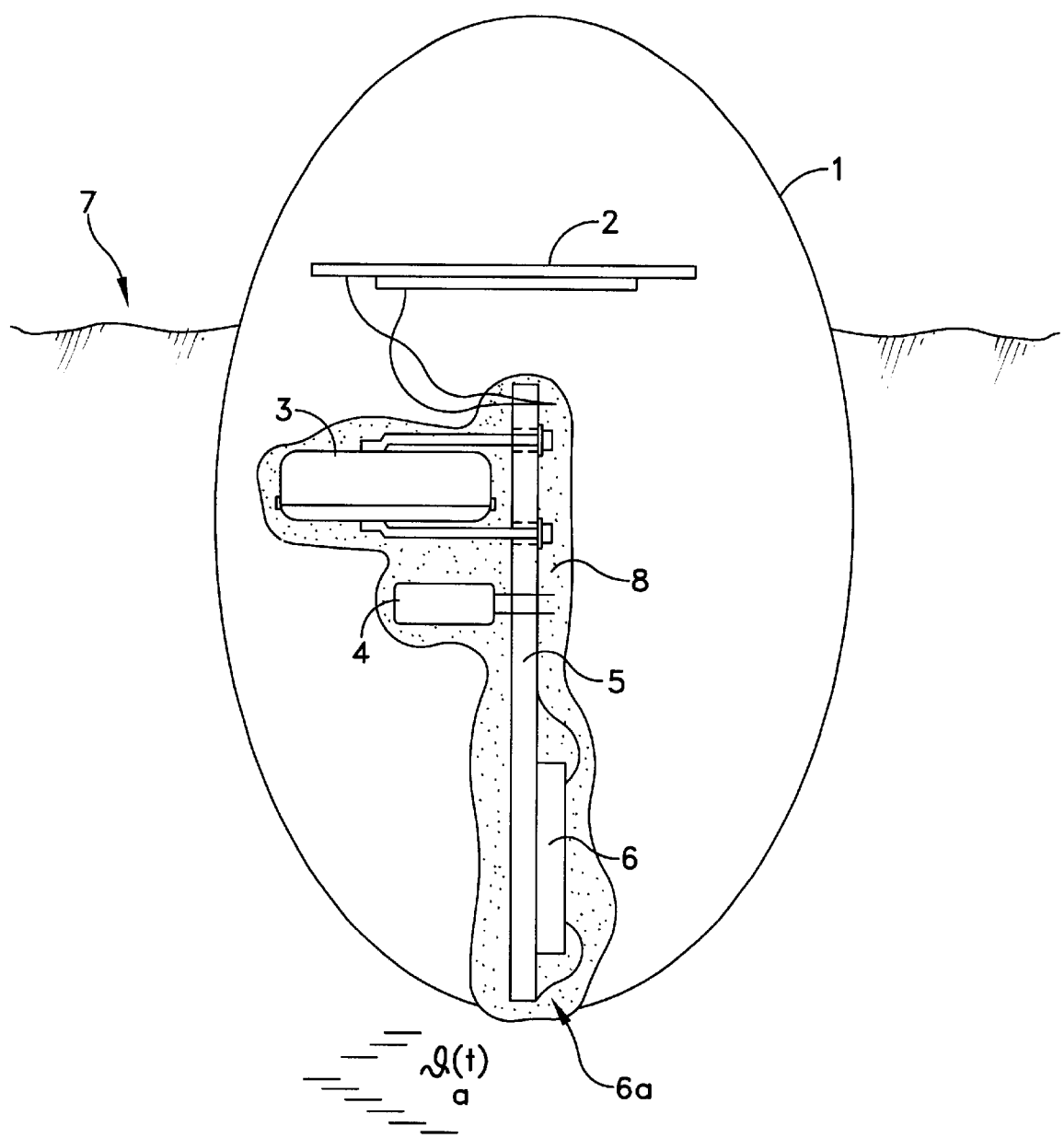
FIG. 1 shows the structure of an embodiment of the device shaped as an egg. A sensor 6a and the entire electronic signaling system are integrated in a chip 6 in the form of a circuit and arranged on a board 5.

The cooking aid of FIG. 1 is enclosed by a cover 1, which at least partially protrudes from the waterline 7, however, in such a manner that the sensor 6a is located below the waterline in order to ensure a good thermal contact with the surrounding water. A signaling device 2 is conveniently a piezo-speaker having a stainless membrane. The electronic circuit (chip 6) is applied to the board 5. The chip 6 also includes, apart from the sensor 6a for the water temperature, a computing unit for the thermal process and a melody generator for the signaling device 2. A quartz 4 provides the basic time of the computing circuit. Other timers may be employed as well, however, quartzes are particularly precise at a relatively low cost.

The circuit 6 is energized by a battery 3. The power consumption of the circuit is chosen such that an operation over several years is possible. The entire circuit is enclosed by a water-repellent, food-compatible protective cover 8 in the light-gray area of FIG. 1. This cover can be produced by dipping or casting. The sensor 6a of the device, which is herein integrated in the chip 6, has a good thermal contact with the water. The signaling device 2 is located above the waterline.

The at least partially floating housing 1 is formed in such a manner that a floating position is achieved which is stable with regard to dimension or weight in order to ensure that the sensor 6a within the chip 6 always maintains a good thermal contact with the water. Apart from the embodiment of the device illustrated herein, it is also possible to separate the sensor 6a from the electronic signaling system 6. Thus, the cover 8 could possibly also dispensed with. The special merit of the embodiment illustrated resides, however, in particular in the electronic system which can be produced at very low cost.

The above described object shaped as an egg 1 according to the embodiment is immersed in a cooking medium 7 together with another cooking item, such as one or several eggs, according to the embodiment, and energized. The egg serving as the cooking aid and comprising the internal circuit 6, after expiration of the period of time suitable for the cooking process, signals the first cooking state of the other eggs by providing a signal tone via the signaling device 2. Other signals may follow when the first cooking state indicates that the cooking state "soft egg" of the other cooking items has been reached. The phases can be represented—especially with eggs in a particularly demonstrative manner—such that an at first soft egg, after the first signal tone, assumes a higher degree of cooking, i.e. becomes a harder egg, after the second signal tone, up to a hard-cooked egg having an even higher degree of cooking when the third signal tone is heard.

In the following it will be explained with reference to the block diagrams of FIGS. 3 and 4 and firstly with reference to the characteristics of the individual system parameters, how the circuit 6 within the egg 1, which is added to the cooking item during the cooking process, works and reacts. The function course described with reference to the egg may equally be applied to the cooking process of other cooking items.

Figure 2:
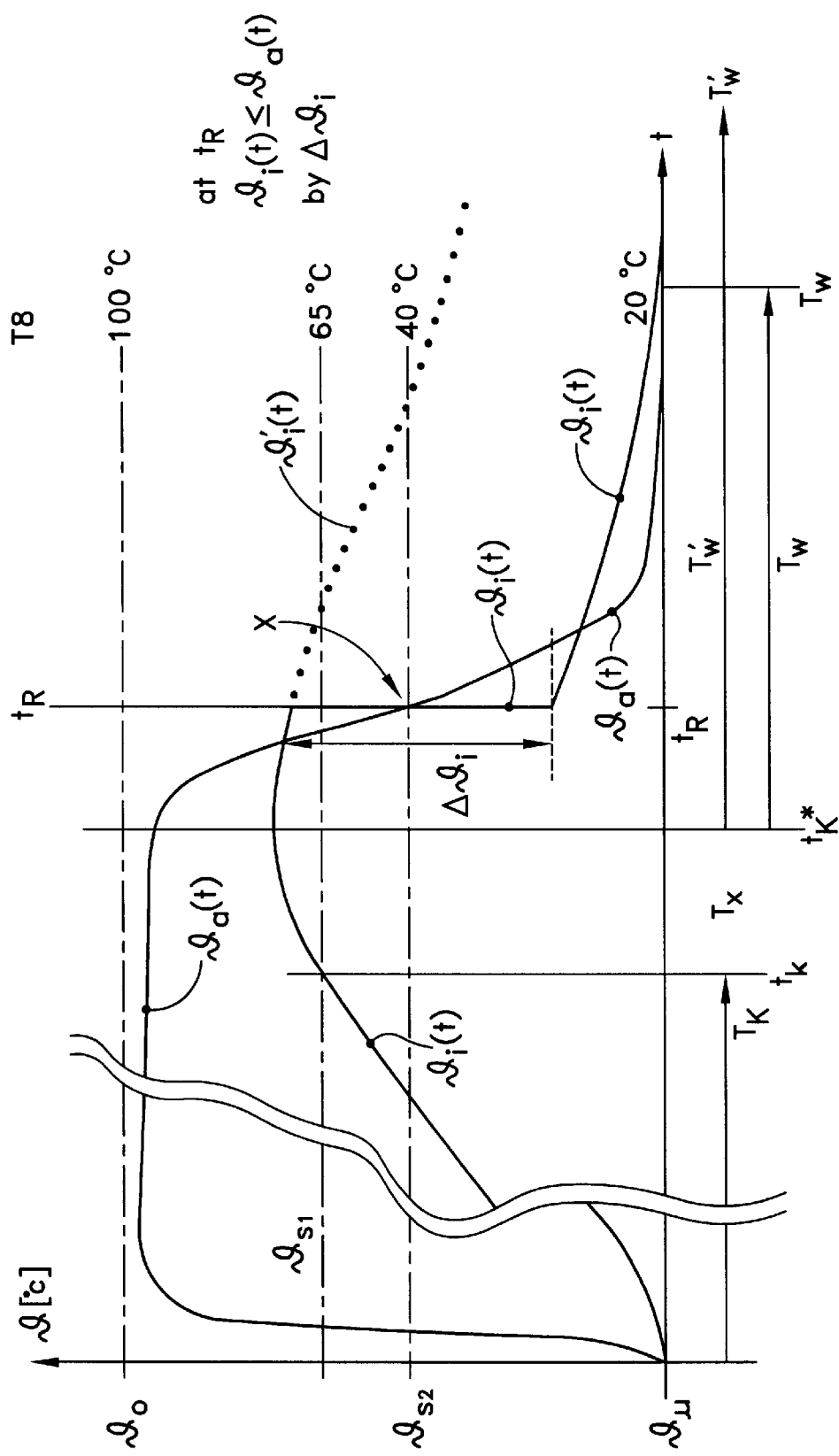
FIG. 2 shows the signal characteristics of the embodiment of the device.

In FIG. 2 the cooking process starts with a rapid and steep increase of the outer temperature $\vartheta_a(t)$, if it is assumed that the temperature of the cooking medium, herein assumed to be water, is approx. 100° C. This boiling temperature $\vartheta_a$ is rapidly reached by the outer surface, i.e. the jacket 1 of the electronic egg illustrated in FIG. 1, starting from the ambient temperature $\vartheta_u$, which can generally be assumed to be 20° C., if Northern European standards are applied.

FIG. 3 shows that the temperature $\vartheta_a(t)$ is sensed as the march of temperature of the cover 1 of the egg by the temperature sensor 6a and transferred to an A/D converter 6b, which controls, by using the outer temperature $\vartheta_a(t)$—now in discrete form—a discretely structured delay stage 15. Its output being the march of the inner temperature $\vartheta_i(t)$, which increases quasi-continuously, as does the excitation function $\vartheta_a(t)$, however, delayed. $\vartheta_i(t)$ is transferred to a comparator 17, which performs a comparison with a threshold value $\vartheta_{S1}$. Said first threshold value represents the point of coagulation of eggs or with other cooking items, respectively, the corresponding threshold, at which the end of a cooking process is assumed. With food containing protein this threshold is approx. at 60° C. to 65° C., with noodles being durum wheat semolina products this threshold is approx. at 80° to 85° C., with potatoes this threshold is assumed to be at approx. 90° C., whereas rice may be cooked with a first threshold value of approx. 80° C. in a well controlled manner.

The output of the comparator 17 is fed to a signaling device 20 which is either directly a loud-speaker or a piezo element. If an additional operating-time member 17a is introduced, an operating time T8 may be started after the first threshold value has been exceeded. This operating time may serve—as explained above—to signal the next or the next but one cooking state. Signaling the next or the next but one cooking state can be signaled by means of a separate loud-speaker 21, preferably, however, with the same loud-speaker 20, as is shown in FIG. 4 in an alternative embodiment. In this connection, not only a reproduction of the cooking process is illustrated but rather also a swelling process which is simulated by a second time constant T2. This combined cooking and swelling process will be explained later on, wherein in addition to or instead of the time constant T2 representing the swelling process an operating-time means 15b having a time constant T3 may be provided as well. In any case the output signal of the delay means 15a or of the operating-time means 15b is fed to a signal circuit 18 via the comparator 17, which circuit 18 realizes one or two operating times T8 and T9 and, in accordance with the temporal situation, drives the piezo element 19 accordingly, based on the output signal of the comparator 17. If this output signal is activated (if it has a flank), the piezo element 19 generates a first signal tone, which is realized as a first melody or a first signal tone by the drive circuit 18. Simultaneously, a first operating time T8 is started and, after expiration of said operating time T8, a second signal tone, which differs from the first one, is signaled via the piezo element 19. A further operating time T9 is simultaneously started, after expiration of which the piezo element 19 provides a further signal tone, which may correspond to the previous signal tone, which may, however, in turn differ from the very first signal tone. For this purpose it is not necessary to implement both operating times T8, T9. The operating times typically amount to one minute starting from the flank of the comparator 17.

The previously addressed delays T1 or T1, T2 or T1, T2, T3 according to FIGS. 3 and 4, representing either only one cooking process or both a cooking and swelling process, are adapted to the cooking item. An egg may well be simulated by a PT1 delay 15 having a time constant of approx. five minutes. For cooking noodles, potatoes or rice a swelling process must also be accounted for. For this purpose, a value of four to six minutes is suitable as the first time constant for the cooking process, whereas for the swelling process a time constant having a value of two to three minutes is appropriate. If a dead time T3 is used, e.g. instead of the second (lesser) delay time T2, the longer delay time T1 may be adapted as well. A dead time of approx. 1,5 to 3 min together with a first delay T1 of four to five minutes is adapted for the combined cooking and swelling process.

As may be gathered from FIG. 3, the measured value of the outer temperature $\vartheta_a(t)$ enters the delay means 15 from the sensor 6a via the AD converter 6b virtually without delay, which leads to an inner temperature value $\vartheta_i(t)$ slowly increasing at the output of the delay means 15, in accordance with FIG. 2. Said time constant is, according to the above explanation, much greater than the rapid warming of the jacket 1 so that, in FIG. 2, a temporal intersection line is illustrated and a considerable period of time, in which nothing new happens, is not shown. Only the time instant at which the inner temperature $\vartheta_i(t)$ comes close to the first threshold $\vartheta_{S1}$ is again illustrated in FIG. 2. It crosses the first threshold at the time $t_k$, at which time the signal tone according to FIG. 4 or FIG. 3 is triggered off. In this connection it is assumed that the user of the device will not react immediately but only after a delay time $T_x$, this being the reason why the inner temperature—the output signal of the delay means 15—continues to increase, however, only to a minor extent, until the user removes the cooking item as well as the cooking aid, comprising the jacket 1 and being immersed into the cooking medium together with the cooking item, from the water at the time $t_k^*$ so that the outer temperature $\vartheta_a(t)$ drops very rapidly and very steeply, whereas the inner temperature virtually shows no change at all yet.

Once the outer temperature crosses a second threshold $\vartheta_{S2}$, which is plotted below the first threshold value in FIG. 2, the parameter of condition of the thermal delay 15 is considerably influenced, in this case by a leap of the value $\Delta\vartheta_l$, which leap takes the parameter of condition of the delay 15 below the instantaneous temperature value of the jacket. Said leap effects an expedient parallel displacement of the slow thermal signal $\vartheta_i(t)$ so that it is able to drop to the ambient temperature $\vartheta_u$ after parallel displacements within a relatively short waiting time without causing great delays which would have been obtained if one considers the hypothetical continuation of the inner temperature signal $\vartheta_i'(t)$—represented by the dotted line in FIG. 2. Without the impulse-like resetting in the temporal area X, i.e. at the time $t_R$, when the outer temperature signal decreases below the second threshold $\vartheta_{S2}$, there would be a very long waiting time $T_w'$ before the cooking aid could be employed for a new cooking process. The leap in the parameter of condition in the temporal area X ensures that the cooking aid is ready to be used again very quickly, i.e. the outer temperature of the jacket virtually reassumes the same value, as does the inner temperature $\vartheta_i(t)$, which is the thermally delayed signal provided by the function means 15.

In FIG. 2 this difference in waiting times is illustrated by the comparison of the two waiting times $T_w$ and $T_w'$, each starting from the time instant of removing the cooking aid from the hot cooking medium up to a virtually complete match of the inner and outer temperature with the ambient temperature $\vartheta_u$.

In FIG. 2 temperature values are given as examples being representative of cooking eggs in water. The boiling temperature of 100° C. is the maximum temperature. The coagulation temperature is the first threshold value $\vartheta_{S1}$ of 65° C., while the threshold value for effecting the resetting is the second threshold value $\vartheta_{S2}$, which is assumed to be 40° C., which is clearly above the ambient temperature, which in this case is assumed to be 20° C., but slightly below the coagulation temperature.

Said values must be appropriately adapted for other cooking items and for other geographical areas, in which the ambient temperature is normally higher than 20° C., as well as for other cooking media, which do e.g. not reach their boiling temperature at 100° C.

Said values are each adjusted in the chip 6 located within the jacket 1, which chip thus not only realizes the delay 15 or 15a but also the resetting logic by means of the circuit R, which is controlled by the non-delayed outer temperature of the jacket 1 measured by the sensor 6a so that, when the drop has a negative gradient, it causes a resetting of the condition parameter—as the output of the function means 15 or 15a according to FIG. 2—at the time $t_R$ and is without function after this impulses like interference until the resetting circuit R, indicated by reference numeral 16, is reactivated. The reactivation is effected when the input temperature $\vartheta_a(t)$ of the function means 15, which represents the temperature measured at the outer surface of the jacket 1, exceeds the first or second threshold value of FIG. 2. Then the resetting circuit R is reactivated such that it is operable, at the time $t_{R'}$, to detect a negative gradient of said march of the measured value and its decrease below a threshold value.

The object achieved is thus simulating the cooking state as precisely as possible, signaling the time instant of the first cooking state—in accordance with the beginning of the coagulation state of the egg—and resetting the electronic system to a state, in which the monitoring of a further cooking process is realistically possible, as quickly as possible.

The previously illustrated leap by $\Delta\vartheta_l$ may be chosen to be smaller or larger. If is chosen larger, the waiting period $T_w$ is much shorter. A direct resetting to the outer temperature $\vartheta_a(t)$ is also possible so that the inner temperature approximates the outer temperature as closely as possible when the resetting is effected. A most appropriate initial condition of the cooking aid is the one in which the inner temperature and the outer temperature, i.e. the input and the output of the function member 15, are virtually equal or at least substantially equal so that a corresponding input correctly detects the cooking state of the cooking items immersed into the cooking medium in parallel to the cooking aid. A too great deviation of said two values at the beginning of the cooking will result in the fact that the cooking aid will not simulate the cooking state developing in the cooking item immersed in parallel into the cooking medium and that the signaling will thus be unreliable.

The digital arithmetic model allows the simulation of the warming-up process as well as the rapid resetting upon removal from the cooking medium and the reduction of the waiting time $T_w$ to a minimum. The reproduction of the cooking state in the digital model may also offer the possibility of simulating the most different cooking items when developing their cooking state, wherein an individual chip may be manufactured such that it is already inherently operable to simulate various cooking items, wherein the placement of the respective bonding wires or other programming to be performed when producing the respective specific design of the cooking aids results in a determination which kind of cooking item is to be monitored by the cooking aid.

In accordance therewith also the outer design may be chosen optically or tactilely. The cooking aid may be designed as an egg which is soft, hard or medium with regard to the design of the jacket 1. The optical outer shape may be selected in accordance with the cooking item, such as a potato for potatoes as the cooking item, a pepper pod for peppers, an object representing China for rice or an object representing Italy for noodles, to name only a few examples of the plurality of designs possible.

The digital arithmetic model also allows the provision of further signals. Thus, a signal may be provided which acoustically represents the turning off already prior to reaching the maximum outer temperature in the sense of the boiling temperature of 100° C. to the user. When this signal is heard the user is informed that the power supply is either to be turned off completely or reduced. In this thermal state the warm or boiling water contains enough energy for bringing the cooking item closer to the first cooking state. In a similar manner a signal may be provided approx. five minutes prior to reaching the desired cooking state upon reaching a previous switching threshold, which signal indicates the time, at which it is possible to turn off the power supply, i.e. to not only reduce the supply of power but to turn it off completely. The mentioned value substantially relates to eggs, it may, however, be adapted to other kinds of cooking items accordingly and is based on experimental values. Also in this case the energy contained in the cooking medium is sufficient to reliably reach the first cooking state, even if no further energy is supplied.

Figure 5:
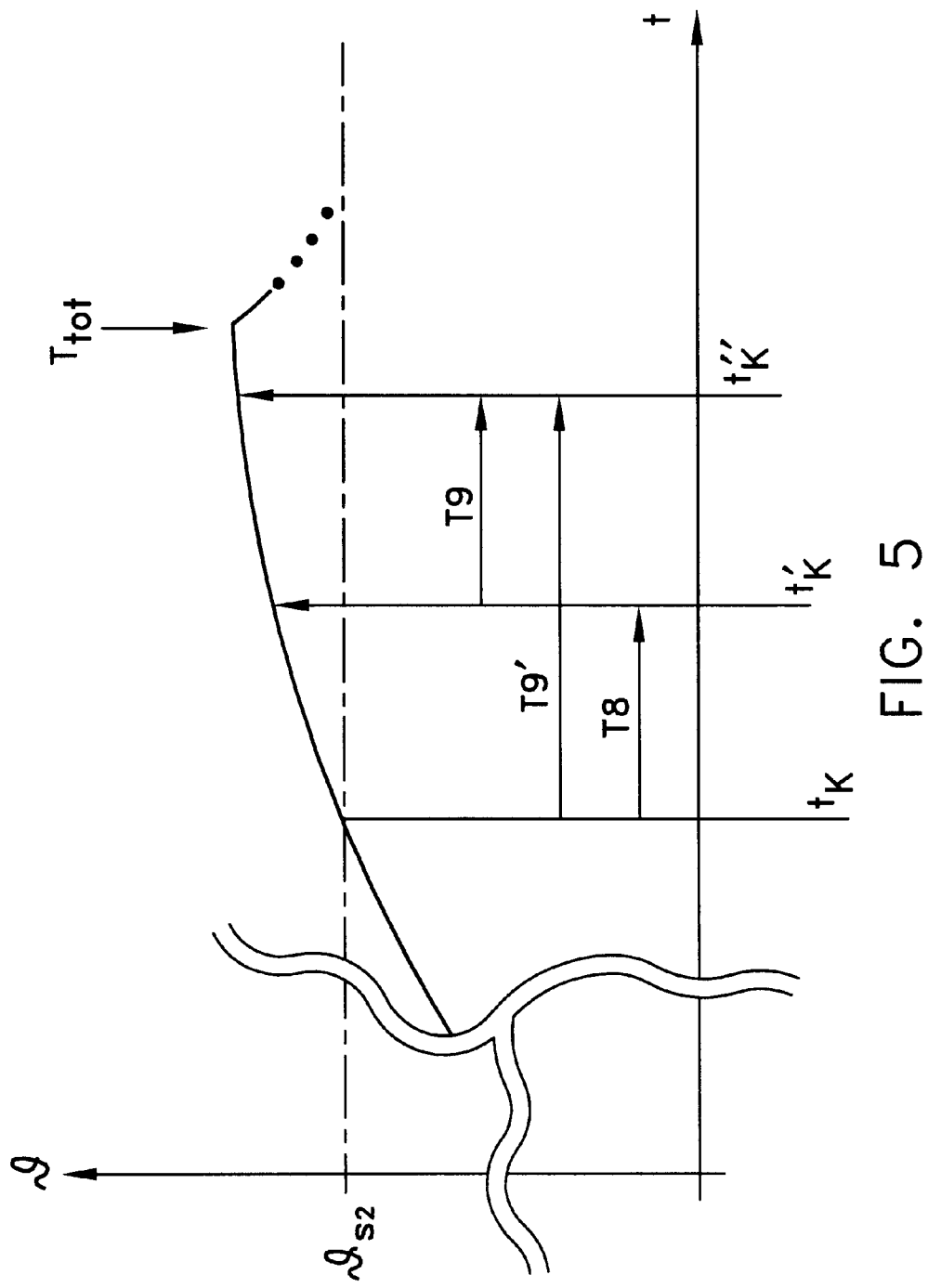
FIG. 5 shows the signal characteristics of a number of cooking states to be indicated, including "soft", "medium" and "hard", of an embodiment of the device shaped as an egg.

The various cooking states mentioned in the beginning, which successively follow each other are illustrated in FIG. 5, which represents a temporal cut-out in the vertical as well as in the horizontal direction from the diagram of FIG. 2.

The first cooking state is reached at the time $t_K$. From this time it would theoretically be assumed that the user removes his food from the cooking medium. If the user ignores this time instant, i.e. he does for example not want a soft egg having the cooking state "soft", then he is probably waiting for a harder cooked egg, which is indicated to him after expiration of the period of time T8 in the signal generator 18 by a signal at the time $t_{K'}$. In case he then still does not remove the food from the cooking medium 7 he will probably neither want an egg having the cooking state "medium" but is surely waiting for the further enhanced cooking state "hard" which is reached at the time $t_{K''}$, after expiration of the operating time T9. After expiration of the operating times T8 and/or T9 one individual signal tone each is provided by the piezo element 19 shown in FIG. 4, wherein the inner temperature $\vartheta_i(t)$ as the output of the thermal delay means 15 or 15a continues to increase until the time of removal, the so-called "take-out time" ($t_{tot}$ in FIG. 5 and accordingly $T_K^*$ in FIG. 2).

Times T8 and T9 may either sequentially succeed each other or may be stated together as times T8 and T9' after the comparator 17 has signaled that the first cooking state has been reached at the time $t_K$ in FIG. 2.

The determination of the first temperature threshold $\vartheta_{S1}$ has been explained before. It is closely connected to the consistency and nature of the cooking item being immersed into the cooking medium together with the cooking aid. The level of the second threshold value $\vartheta_{S2}$ is selected to be between the first threshold value and the normal ambient temperature prevailing in the places where the cooking aid is employed. If it is assumed that this normal ambient temperature as the outer temperature, which is usually encountered outside the cooking medium 7, is 20° C. and that the first threshold value $\vartheta_{S1}$ is at 65° C., then it is advisable to chose the second threshold value slightly below the first threshold value in order to effect the unsymmetrical resetting during the cooling stadium in the area X of FIG. 2 as quickly as possible and to enable a considerable leap of the resetting range $\Delta\vartheta_t$ as well as a parallel displacement of the delayed march of the condition parameter of the function member 15 as far as possible. A too low value of decrease and a too late beginning of said decrease will result in a too long waiting time, wherein a too steep decrease of the first threshold value towards the "normal ambient temperature $\vartheta_u$" enhances the risk that the cooking aid will not work properly at higher ambient temperatures which may well be encountered, if said normal ambient temperature is already above the second threshold value. In accordance therewith a person skilled in the art will perform the exact determination of the second threshold $\vartheta_{S2}$ considering the dimensioning guideline applicable here.

The impulse-like decrease of either the time constants in the functioning members 15, 15a and/or of the condition parameters $\vartheta_t(t)$ or other delay values with delay means of the second or third order allows only a single interference and then the adjustment of the cooking aid as realistically as possible for the further system conditions. If a resetting signal would be active too long, no realistic follow-up of a cooking process possibly already starting again would be possible for a long period of time. Therefore, it is advantageous to chose the impulse-like resetting and to perform the reactivation of the resetting circuit R only when the non-delayed temperature signal $\vartheta_a(t)$ measured with as little delay as possible exceeds a high threshold value and has a positive gradient, which higher threshold value should in any case be above all normally encountered ambient temperatures $\vartheta_u$ in the respective geographical region of the use of the cooking aid.

It cannot always be relied upon that the temperature of the cooking medium is substantially above the first threshold value $\vartheta_{S1}$, rather e.g. eggs may also be cooked when the temperature of the cooking medium is only slightly or somewhat above the coagulation point of 65° C., i.e. amounts to for example 70° C. or 80° C. for the cooking medium. In this case the switching operations are still reliably controlled by the suggested threshold values, since the second threshold value is below the temperature for reaching the coagulation point of the egg. If boiling temperatures of approx. 100° C. were always assumed, then a circuit would still work, even when the second threshold value was above the first threshold value, however, this cannot always be expected—as explained above—for a reliably working aggregate.

The further provided thresholds, i.e. the third threshold and the forth threshold, which are associated with the early turning off of the power supply or the signaling of a possible reduction of the power supply, may be determined by using similar deliberations.

I claim:

1. A device for signaling at least one cooking state of at least one cookable item, such as an egg, a potato, a pepper, rice, noodles, in a liquid cooking medium, said device comprising an at least partially floating jacket, a temperature sensor arranged in a thermally conductive communication with an outside of said jacket, an analog to digital converter, and a signaling device, having (a) a digital computing unit, comprising a digital delay portion, to delay a first temperature value of the liquid cooking medium, measured and digitized, said delay portion having at least one time delay to provide a thermally delayed second temperature value as an output of said delay portion;

(b) an activating device to activate the signaling device once said second temperature value approaches a first temperature threshold for signaling a first cooking state of the at least one cookable item.

2. The device according to claim 1, wherein the at least one time delay during cooling off is reduced substantially stepwise, so that a cooling-off behavior compared to a warming-up behavior of the device is unsymmetrical.

3. The device according to claim 1, wherein a cooking process of the at least one cookable item is reproduced by use of a difference equation in the digital computing unit, said equation having an input and an output and wherein the input of the difference equation is the first temperature value of the liquid cooking medium measured substantially without delay and the output is the second temperature value delayed by at least one time delay.

4. The device according to claim 1, wherein the temperature sensor is integrated as a band-gap temperature sensor into an integrated circuit further comprising the converter, the digital computing unit and an electronic control system for the signaling device.

5. The device according to claim 1, wherein the digital computing unit is accommodated within said jacket and wherein the signaling device is arranged at an upper portion of the jacket.

6. The device according to claim 1, wherein said jacket is tactilely related to a desired cooking state of the cookable item and wherein the computing unit is adapted to signal that said cooking state has been reached.

7. The device according to claim 1, wherein the jacket is optically related to the cookable item.

8. The device according to claim 7, wherein the device has a shape of one of an egg, a potato and a Tortellini.

9. The device according to claim 1, wherein once the first temperature value reaches a third temperature threshold, below a boiling temperature of the cooking medium and above said first threshold, a further signal is produced by said digital computing unit, for indicating a time instant for switching off an energy supply to the cooking medium, said indication being different from the first cooking state signalling.

10. The device according to claim 9, wherein prior to reaching the first cooking state and once the second temperature value reaches a fourth threshold a signal is produced, which signals a time instant for reducing a supply of power, in a manner different to the way the first cooking state is signaled.

11. The device according to claim 1, wherein prior to reaching the first cooking state and once the second temperature value reaches a fourth threshold a signal is produced, which signals a time instant for reducing a supply of power to the cooking medium, in a manner different to the way the first cooking state is signaled.

12. The device according to claim 1, wherein once the first temperature value reaches the first temperature threshold a timer is started, which causes at least one further signal to be produced in order to indicate at least one further and higher cooking state in a manner different to the first cooking state signaling.

13. The device according to claim 1, wherein an electronic assembly comprising the sensor is water-tightly covered and incorporated within the jacket together with the signaling device such that the cooking medium directly contacts a part of the assembly in order to sense and track a temperature value of the jacket by means of the temperature sensor.

14. The device according to claim 1, wherein the delay portion comprises two time delays, one of which being smaller than the other, in order to account for both a more rapid swelling process of the cookable item and a slower cooking process.

15. The device according to claim 2, wherein the at least one time delay having a first value and the reduction of this value is effected by an impulse-like decrease of the at least one time delay to a much smaller value representing a further time delay and to subsequently return to the at least one time delay with its first value.

16. The device according to claim 15, wherein a reduction of the time delay is a substantially stepwise decrease of the second temperature value, which decrease is effected when the temperature value measured by the sensor drops below a predetermined second temperature threshold.

17. The device according to claim 2, wherein the reduction of the time delay is an impulse-like decrease of the inner temperature value, which decrease is effected when the first temperature value drops below a second temperature threshold.

18. The device according to claim 17, wherein the second temperature threshold is substantially above an outer temperature normally encountered outside the cooking medium and below the first temperature threshold.

19. The device according to claim 1, wherein a dead time also contributes to the delay of the first temperature value.

20. The device according to claim 1, wherein a resetting device is provided which has an impact effect on the thermally delayed second temperature value, when (a) the first temperature value as measured by the sensor decreases, (b) the decreasing temperature value decreases below a second threshold value having a lower value than the first temperature threshold value, wherein the resetting device, after the impact effect, is reactivated for such further effect only when the first threshold value or the second threshold value is exceeded by the first temperature value.

21. The device according to claim 1, wherein a dead time unit is provided in said digital computing unit, to contribute to the delay of the second temperature value.

22. The device according to claim 1, wherein said jacket serves as a surrounding housing of the device.

23. A method of operating a device according to claim 1, wherein a cooking process of the at least one cookable item is reproduced by use of a difference equation in the digital computing unit, said equation having an input and an output and wherein the input of the difference equation is the first temperature value of the liquid cooking medium measured substantially without delay and the output is the second temperature value delayed by at least one time delay.

24. An apparatus for signaling at least one cooking state of at least one cookable item in a liquid cooking medium, comprising an at least partially floating jacket, a temperature sensor for measuring a temperature value, a digital computing unit having a delay portion to delay said measured temperature value and provide a delayed temperature value further comprising a signal provider, wherein (a) a control device is provided for activating the signal provider upon a first temperature threshold value is reached by said delayed temperature value, to signal a first cooking state of the at least one cookable tem;

(b) a resetting device is provided, having diminishing effect on the delayed temperature value, upon
i) the temperature value measured by the sensor decreases, and
ii) the decreasing temperature value passes a second threshold value having a lower value than the first temperature threshold value.

25. The apparatus according to claim 24, wherein the resetting device, after the decreasing impulse effect, is not operable to be activated for a further decreasing effect until the first threshold value or the second threshold value is exceeded by the measured temperature value.

26. A device for signaling at least one cooking state of at least one cookable item in a liquid cooking medium, comprising an at least partially floating jacket, a temperature sensor for measuring an outer temperature value related to said cooking medium and a signaling device, further comprising (a) a control device for activating the signaling device when a first temperature threshold is reached, to signal a first cooking state of the at least one cookable item;

(b) a digital computing unit, to digitize the outer temperature value and delay the outer temperature value to provide a thermally delayed temperature value for comparing to the first temperature threshold and to activate the signaling device, when said first temperature threshold is one of reached, approached or crossed.

* * * * *